(No Model.) 2 Sheets—Sheet 1.
W. J. KELLEY.
MODE OF MANUFACTURING MOSAIC WOOD WORK.
No. 392,809. Patented Nov. 13, 1888.
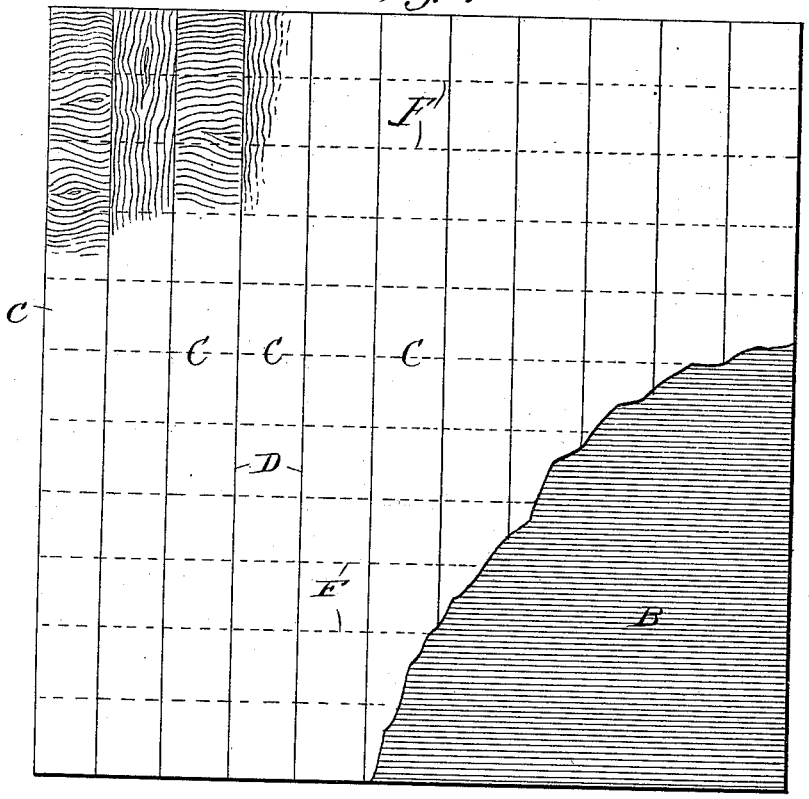
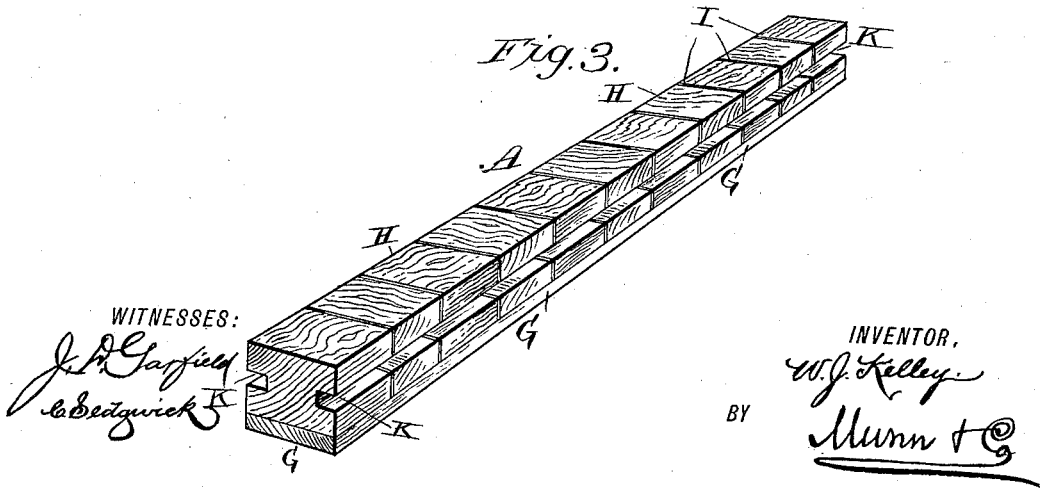

(No Model.) 2 Sheets—Sheet 2.
W. J. KELLEY.
MODE OF MANUFACTURING MOSAIC WOOD WORK.
No. 392,809. Patented Nov. 13, 1888.
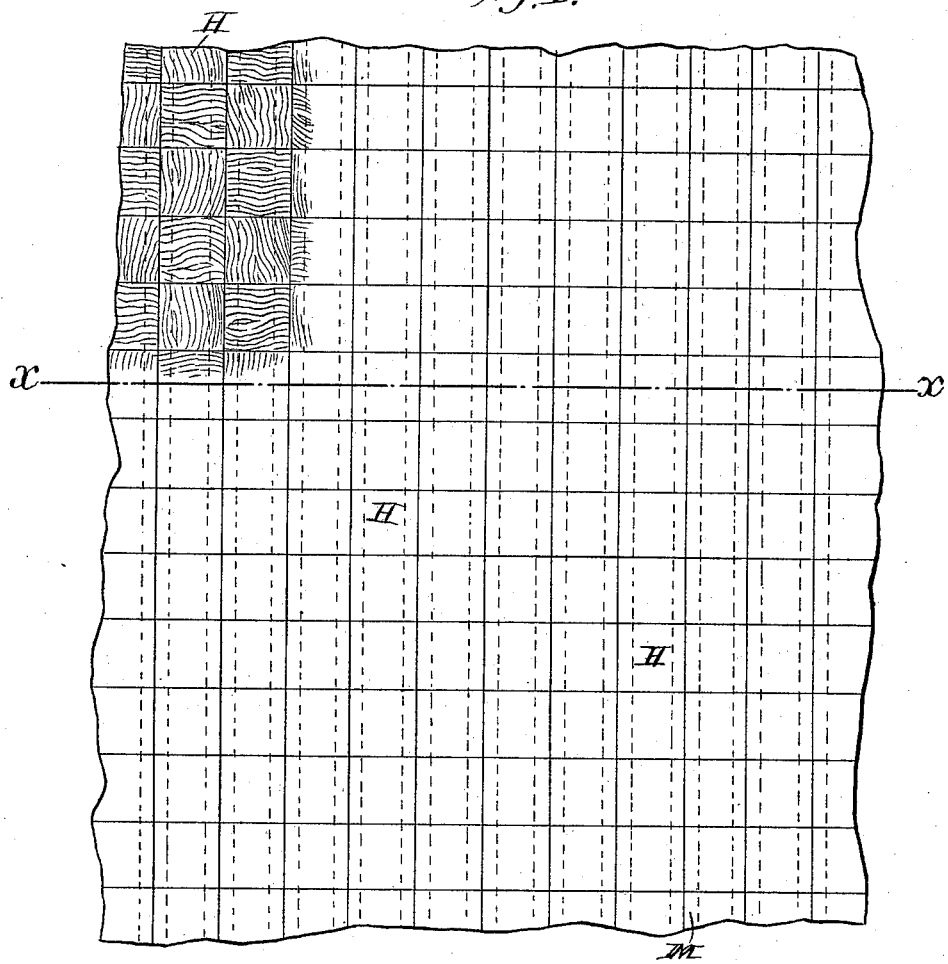
Fig. 4.
Fig. 5.
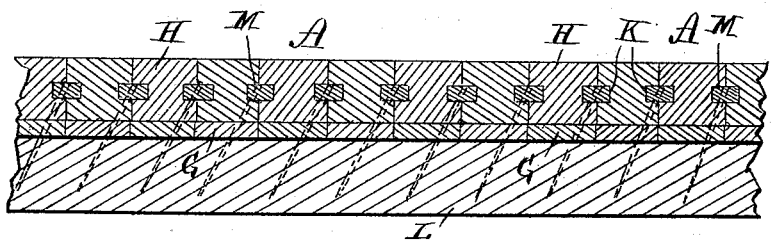
WITNESSES:
INVENTOR,
W. J. Kelley
BY
Munn & Co
ATTORNEY,

UNITED STATES PATENT OFFICE.

WILLIAM J. KELLEY, OF PITTSFIELD, ASSIGNOR TO THE SPRINGFIELD WOOD WORKING COMPANY, OF SPRINGFIELD, MASSACHUSETTS.

MODE OF MANUFACTURING MOSAIC WOOD-WORK.

SPECIFICATION forming part of Letters Patent No. 392,809, dated November 13, 1888.

Application filed July 12, 1888. Serial No. 279,719. (No model.)

*To all whom it may concern:*

Be it known that I, WILLIAM J. KELLEY, of Pittsfield, in the county of Berkshire and State of Massachusetts, have invented a new and useful Improvement in the Manufacture of Mosaic Wood-Work, of which the following is a full, clear, and exact description.

This invention relates to an improvement in the mode of forming a mosaic flooring or wainscoting by first manufacturing composite strips having a facing of mosaic blocks, and then arranging such mosaic strips side by side upon the floor-base or wall in a manner to delineate the desired pattern.

This application relates more particularly to the manufacture of the mosaic strips for such purpose; and the invention, so far as this application is concerned, consists of a novel method of manufacturing the composite strips, which will be hereinafter particularly set forth and claimed, and whereby mosaic strips may be expeditiously and economically produced of a character peculiarly adapted to the formation of a handsome, durable, and economical mosaic flooring or wainscoting, as will be hereinafter shown.

Reference is to be had to the accompanying drawings, forming a part of this specification, in which similar letters of reference indicate corresponding parts in all the figures.

Figure 1 is a plan view of a composite slab formed in the process of manufacturing mosaic strips according to my invention, part of the facing of the said slab being broken out. Fig. 2 is an edge view of the said slab. Fig. 3 is a perspective view of one of the mosaic strips made from the slab. Fig. 4 is a plan view of a mosaic flooring formed of said mosaic strips. Fig. 5 is a cross-section of the said flooring on the line *x x*, Fig. 4.

In manufacturing the improved mosaic strips A, thin slightly-flexible sheets, as B, preferably two or three feet square, are sawed from some soft wood—for example, pine—in such a manner that the grain will run lengthwise thereof, as indicated in Fig. 1, and upon each sheet B are placed together, side by side, a series of vari-colored hard-wood facing-strips, C, the grain of successive ones of which is alternately crosswise of and in the direction of their length, in such a manner that the length of the strips C will be transverse to the grain of the wooden backing-sheet B. The bottoms only of the facing-strips C are glued to the backing-sheet B, the respective abutting side faces, D, of the strips C being left wholly detached, but brought into the necessary close relation with each other before the glue is dried by lateral pressure suitably applied to the outside strips, C. The composite slab E thus formed, and illustrated in Figs. 1 and 2, is, when fully dried, sawed through on lines F transverse to the length of the facing-strips C, and thus parallel to the grain of the wooden backing-sheet B, in such a manner as to make the composite strips A of a width equal to that of the original facing-strips C, and each consisting of a backing-strip, G, having a longitudinal grain, and a single succession of vari-colored square facing-blocks, H, coincident in width therewith, having alternately a transverse and a longitudinal grain, their bottom faces firmly attached by the glue to the backing-strip G, but their respective abutting faces I disunited.

In applying the composite strips A to the formation of a mosaic flooring in the manner illustrated in Figs. 4 and 5 they are first run, like ordinary integral wooden strips, through a grooving-machine, whereby longitudinal grooves K are cut in the parts of their opposite side edges formed by the corresponding edges of the series of facing-blocks H, and are then placed side by side on the floor-base L in such a manner that each block H will adjoin other blocks H having a reverse grain thereto, and also the desired pattern be delineated. The respective abutting grooved side edges of the composite strips are connected by longitudinal splines M, which are blind-nailed in the grooves and to the floor-base L in a manner common in laying plain board flooring, so that the backing-strips G, and hence the facing-blocks H, will be immovably secured to the floor-base or wall, while the said facing-blocks will be free to expand and contract in either direction independently of each other. The expansion or contraction being thus confined to each block, warping and opening of the joints will be prevented. This independence of the component blocks H is secured without the necessity of applying them singly to the floor-base, they being capable of being laid by this means very readily and cheaply, and the stiffness of the wooden backing-strips G will cause them to bridge sudden inequalities in the floor-base, while their slight natural flexibility will permit them to conform to gradual variations in the level of the floor-base.

No claim is made in this application to the described mosaic strips or the mosaic woodwork formed thereby, *per se*, as the same are included in a separate application filed by me herewith.

Having thus described my invention, what I claim as new, and desire to secure by Letters Patent—

As an improvement in the herein-described mode of forming mosaic floorings and wainscotings, the process of manufacturing mosaic strips, which consists in first gluing upon an integral backing-sheet of wood, side by side, a number of reverse-grained vari-colored wooden facing-strips in such a manner that the length of the strips will be transverse to the grain of the wooden backing-sheet, and in then sawing through the composite slab thus formed on lines transverse to the length of the facing-strips, and thus with the grain of the wooden backing-sheet, as and for the purpose specified.

WILLIAM J. KELLEY.

Witnesses:
JAMES B. CARROLL,
J. P. HARDING.